United States Patent
Fisch (12)

(10) Patent No.: US 6,297,847 B1
(45) Date of Patent: Oct. 2, 2001

(54) REMOVAL OF INTERPOLATION ARTIFACTS IN A NON-INTERLACED VIDEO STREAM

(75) Inventor: Eberhard H. Fisch, Sunnyvale, CA (US)

(73) Assignee: S3 Graphics Co., Ltd., Cayman Islands (KY)

( * ) Notice: Subject to any disclaimer, the term of this patent is extended or adjusted under 35 U.S.C. 154(b) by 0 days.

(21) Appl. No.: 09/128,397

(22) Filed: Aug. 3, 1998

(51) Int. Cl.[7] ............................. H04N 7/01; H04N 11/20
(52) U.S. Cl. ..................... 348/447; 348/448; 348/449; 348/458; 348/910
(58) Field of Search ................................. 348/447, 448, 348/449, 458, 910

(56) References Cited

U.S. PATENT DOCUMENTS

| | | | |
|---|---|---|---|
| 4,982,280 | * | 1/1991 | Lyon et al. ........................... 348/448 |
| 5,610,661 | * | 3/1997 | Bhatt ................................... 348/448 |
| 5,995,154 | * | 11/1999 | Heimburger ......................... 348/448 |
| 6,034,733 | * | 3/2000 | Balram et al. ....................... 348/448 |
| 6,040,869 | * | 3/2000 | Dischert .............................. 348/448 |

OTHER PUBLICATIONS

"Bob Method," Jul. 20, 1998, Page 1 of 1.
"Displaying Interleaved Video with VPE: Bob and Weave," Jul. 20, 1998, Page 1 of 1.
"Weave Method," Jul. 20, 1998, Page 1 of 1.

* cited by examiner

Primary Examiner—Reinhard J. Eisenzopf
Assistant Examiner—Brian P. Yenke
(74) Attorney, Agent, or Firm—Carr & Ferrell LLP (57) ABSTRACT

Visible artifacts introduced into a digitally sampled video signal are removed from a non-interlaced version of the video signal. The non-interlaced version of the video signal is generated by a converter that converts a digitally sampled interlaced video stream to a non-interlaced video stream. An artifact removal module responds to at least a first component of the non-interlaced video stream by adaptively modifying the first component of the non-interlaced video stream to reduce artifacts introduced into the non-interlaced video stream by the converter to generate a modified non-interlaced video stream.

13 Claims, 6 Drawing Sheets

REMOVAL OF INTERPOLATION ARTIFACTS IN A NON-INTERLACED VIDEO STREAM

FIELD OF THE INVENTION

This invention pertains generally to the field of computer graphics and more particularly to removal of visually discernible artifacts in a digitally sampled non-interlaced video signal.

BACKGROUND OF THE INVENTION

Video data originally developed for television screens must be reformatted before it can be displayed on most computer displays. Television screens typically require data in 2:1 interlaced format, which means a full frame of data is comprised of two spatially and temporally offset fields, typically referred to as odd and even fields. Computer displays typically require non-interlaced data (also referred to as "progressively scanned" data). Displaying video data produced for standard televisions on personal computers therefore typically requires that the video data be converted from an interlaced format to a non-interlaced format.

In Personal Computers (PCs), the two most common conversion techniques are spatial line doubling by interpolation and field recombining. Spatial line doubling by interpolation which is embodied in a technique referred to as "Bob" supported by the Microsoft Corporation, involves taking one field at a time and spatially interpolating to obtain the missing lines, usually by averaging the line above and below each missing one. Field recombining which is embodied in a technique referred to as "Weave" supported by the Microsoft Corporation involves interleaving both fields back together to get a spatially complete frame. The former approach ("Bob") is better suited for video with high motion content but produces a clearly visible loss of resolution for relatively static scenes. The latter technique ("Weave") is better suited for relatively static scenes but produces highly objectionable artifacts called feathering or ghosting when significant motion is present.

In current and past commercially available PC systems it has generally not been possible to determine whether a live video source has motion in it or not, hence "Bob" is typically used because it produces less objectionable artifacts. Moreover, the "Bob" technique allows for a relatively low cost hardware implementation using only one line delay memory. Unfortunately, artifacts produced by the "Bob" technique still exist, the most objectionable being jagged or staircase like effects on diagonal lines and edges in an image.

SUMMARY OF THE INVENTION

In a principal aspect, the present invention provides processing to remove visually objectionable artifacts from a non-interlaced video signal. In accordance with the principles of the present invention, a graphics processor comprises a scan conversion module that is responsive to an interlaced video signal for generating a non-interlaced signal as a function of interpolation of scan lines of the interlaced signal. An adaptive non-linear filter is responsive to the non-interlaced signal for adaptively removing jagged-edge artifacts in images represented by the non-interlaced signal.

Advantageously, jagged lines or edges introduced into a video signal by conversion from interlaced to non-interlaced format are masked (smoothed) without noticeable degradation of the quality of the rest of the picture. Moreover, field memories, which increase hardware requirements and costs, are not required.

These and other features and advantages of the present invention may be better understood by considering the following detailed description of a preferred embodiment of the invention. In the course of this description, reference will frequently be made to the attached drawings.

DETAILED DESCRIPTION OF THE PREFERRED EMBODIMENTS

Figure 1:
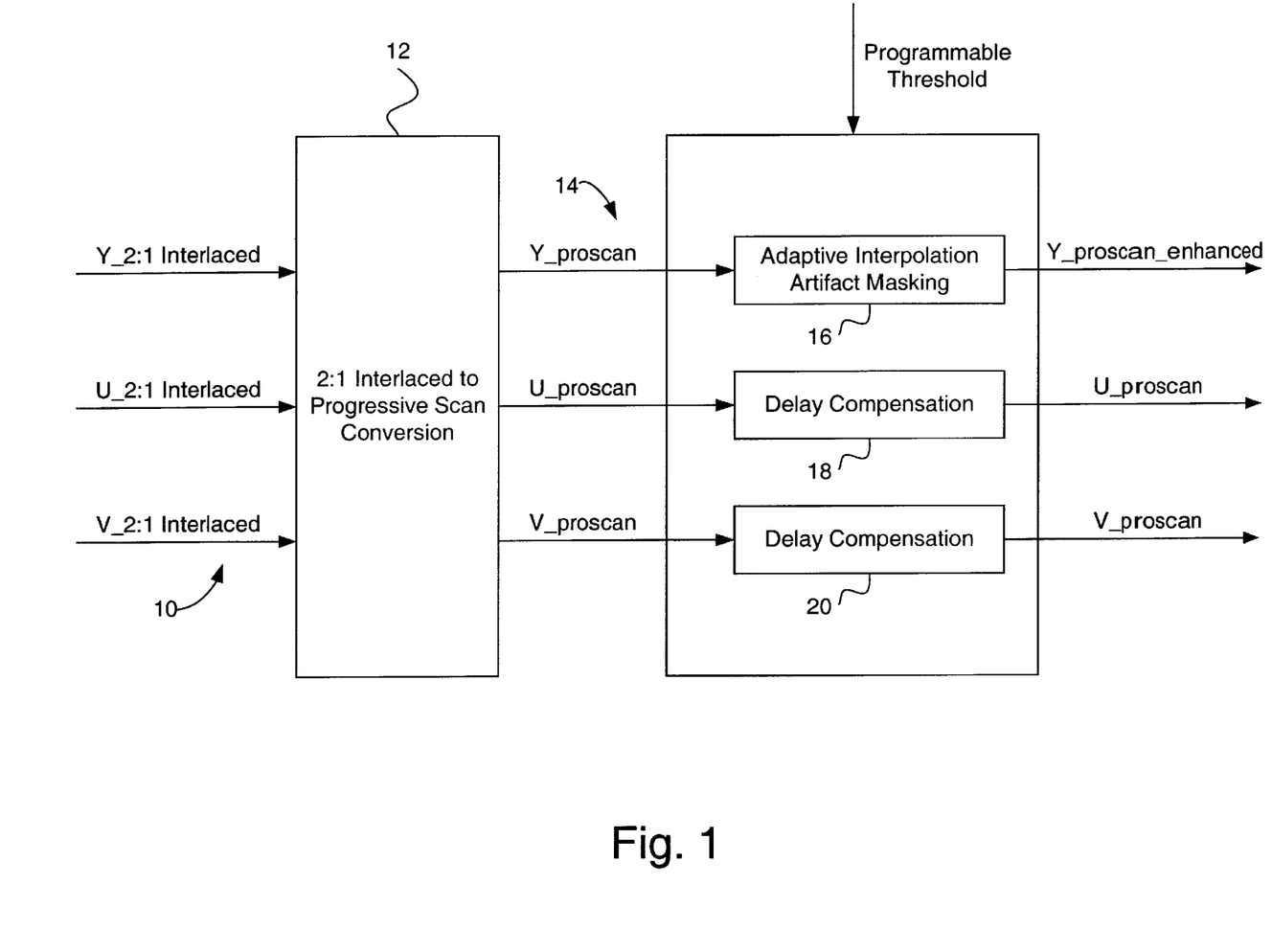
FIG. 1 is a high-level block diagram of a system employing the principles of the present invention.

In FIG. 1 of the drawings, a conventionally formatted YUV digital signal 10 is received by an interlaced to progressive (non-interlaced) scan conversion module 12 for conversion into a non-interlaced YUV formatted signal 14. The converter 12 performs the conversion from interlaced to non-interlaced in accordance with a spatial line doubling by interpolation technique, such as the Bob technique specified by Microsoft Corporation. The signal 14 can take a variety of formats and is not limited to a YUV format. For example the signal 14 can take a YCrCb, YIQ or RGB format.

Adaptive artifact removal module 16 operates in accordance with the principles of the present invention to remove artifacts, most notably, jagged or staircase like diagonal lines and edges in images embodied in signal 14. It should be noted that adaptive artifact removal module 16 is most effective when operating on a non-interlaced signal generated from an interlaced signal by a Bob type converter. However, the module 16 is also effective in removing, from other signals, artifacts that are of the type generated by a Bob type converter. Delay compensation modules 18 and 20 insert a delay into the U and V components, respectively, of signal 14. The amount by which the U and V components are delayed by modules 18 and 20 is equal to an amount by which the Y component is delayed by module 16. Modules 18 and 20 essentially operate to equalize the delay between the three components of the signal 14 and therefore to ensure that all three components of the signal 14 are time synchronized.

Figures 2, 3:
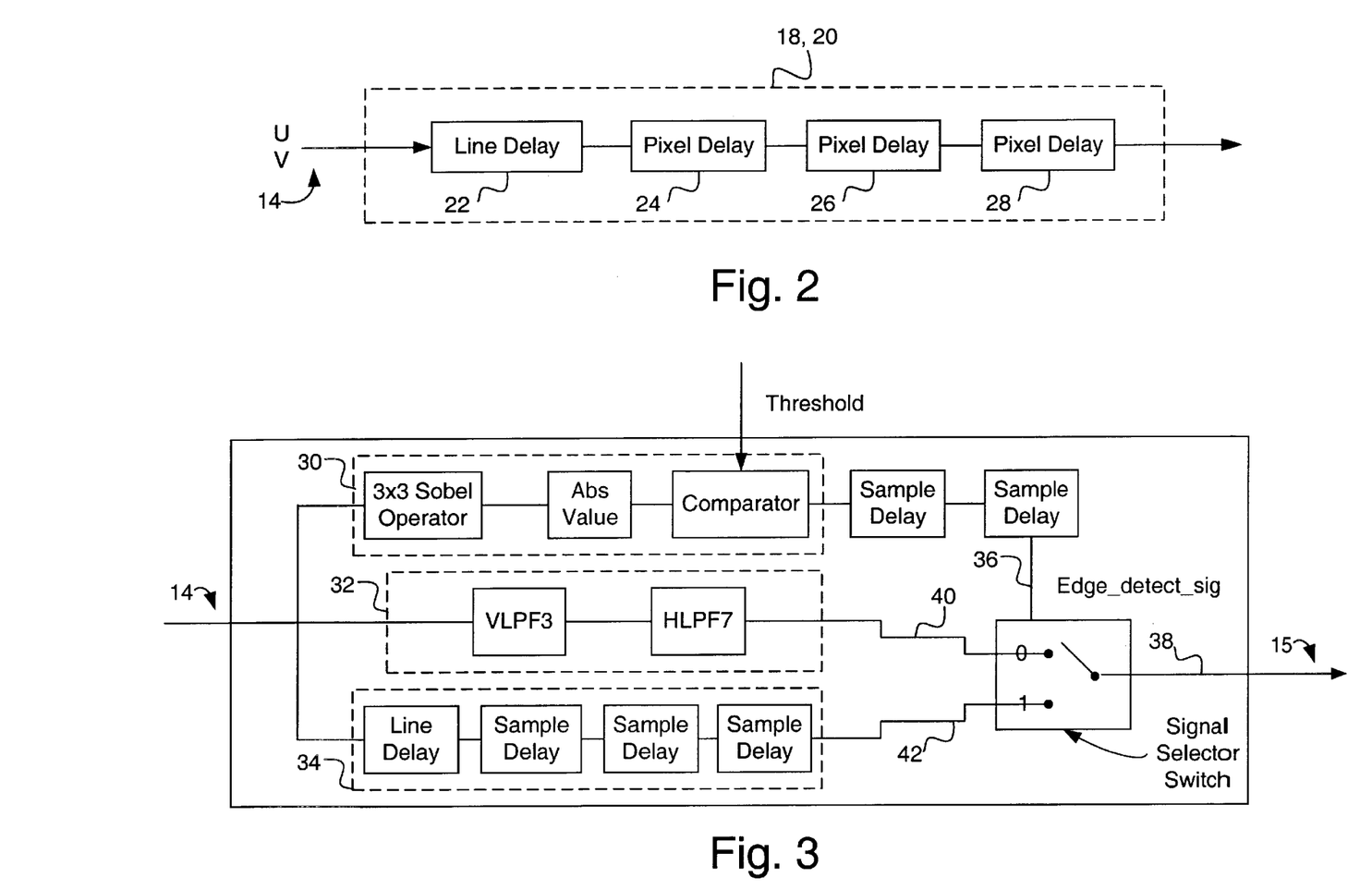
FIG. 2 is a block diagram showing further details of the delay compensation modules of FIG. 1.
FIG. 3 is a block diagram showing further details of artifact removal in accordance with the principals of the present invention.

FIG. 2 of the drawings illustrates delay compensation modules 18 and 20 in further detail. The adaptive artifact removal module 16 in the embodiment described herein introduces a time delay into the Y component of signal 114 of one scan line, and three pixels. The delay compensation modules 18 and 20 therefore include a line delay module 22 to introduce into the U and V components of signal 14, a line delay equal to the line delay introduced by adaptive artifact removal module 16. Pixel delay modules 24, 26 and 28 together introduce into the U and V components of signal 14, a pixel delay equal to the pixel delay introduced by adaptive artifact removal module 16. The line delay module 22 and the pixel delay modules 24, 26 and 28 take the form of conventional storage devices that buffer the incoming component of the signal 14 for an amount of time equal to the desired delay. The exact implementation of the delay compensation modules 18 and 20 is not critical and can take any form that provides the required delay.

The chrominance (U,V) components of the signal 14 exhibit a lower horizontal bandwidth than the luminance (Y) component of the signal 14. Additional horizontal low-pass filtering therefore has less influence on the signal quality. Thus, it is generally sufficient to apply the adaptive interpolation provided by module 16 to only the luminance component. However, if enhancement of the chrominance components is desired, either one or both of the delay modules 18 and 20 can be replaced with the adaptive interpolation module 16. If the signal 14 is in a RGB (Red, Green, Blue) format, then each component of the signal 14, which contains both luminance and chrominance components, will have equal resolution and each component should be operated upon by adaptive interpolation module 16.

FIG. 3 of the drawings illustrates adaptive artifact removal module 16 in further detail. The module 16 comprises three sub-modules 30, 32 and 34, arranged in parallel to each other receive the Y component of signal 14. Sub-module 32 performs filtering, as described in further detail below, on the Y component of signal 14 to reduce the resolution of the received component of signal 14. Sub-module 34 inserts a time delay into the Y component of signal 14 that is equal to the time delay imposed by sub-module 32. Sub-module 30 performs a binary edge detection operation on the Y component of signal 14 to generate a selection signal 36 that selects, by way of selector 38, either the output of sub-module 32 (signal 40) or the output of sub-module 34 (signal 42). The output signal 15 is a time delayed version of signal 14 that is otherwise either the same as the signal 14 or filtered to reduce the resolution of the signal 14. Selection of the filtered signal 40 or the purely time delayed signal 42 is performed as a function of non-horizontal transitions contained in images represented by signal 14.

The sub-modules 30, 32 and 34 are now described in further detail. Sub-module 30, shown in further detail in FIG. 4, includes a 3×3 Sobel operator 44 that takes the form of a square convolution mask or matrix for vertical (non-horizontal) edge detection. The Sobel operator 44 is preferred for edge detection but can be replaced with a vertical high-pass type filter with acceptable results. Use of various high-pass filters may require proper tuning of the threshold level 50. The output of the Sobel Operator 44 is received by an absolute value module 46 that generates the absolute value (magnitude) of the input. Selector 38 compares the output of the module 46 with a stored threshold value 48. The selector 38 generates an output that is a logical "one" if the input value to the selector 38 is greater than the stored threshold value 48, and a logical "zero" otherwise. The stored threshold value 48 is preferably stored in a programmable register 50 to allow the value to be changed.

For ease of understanding, it should be noted that a vertical edge in an image, such as created by a doorway or the side of a building, generates an abrupt horizontal transition. A horizontal edge in an image, such as created by a top of a doorway or flat top of an object, generates an abrupt vertical transition. As used herein, the term "vertical edge detection," or variants thereof, refers to detection of a vertical transition. The term "horizontal edge detection," or variants thereof, refers to detection of a horizontal transition.

Figure 4:
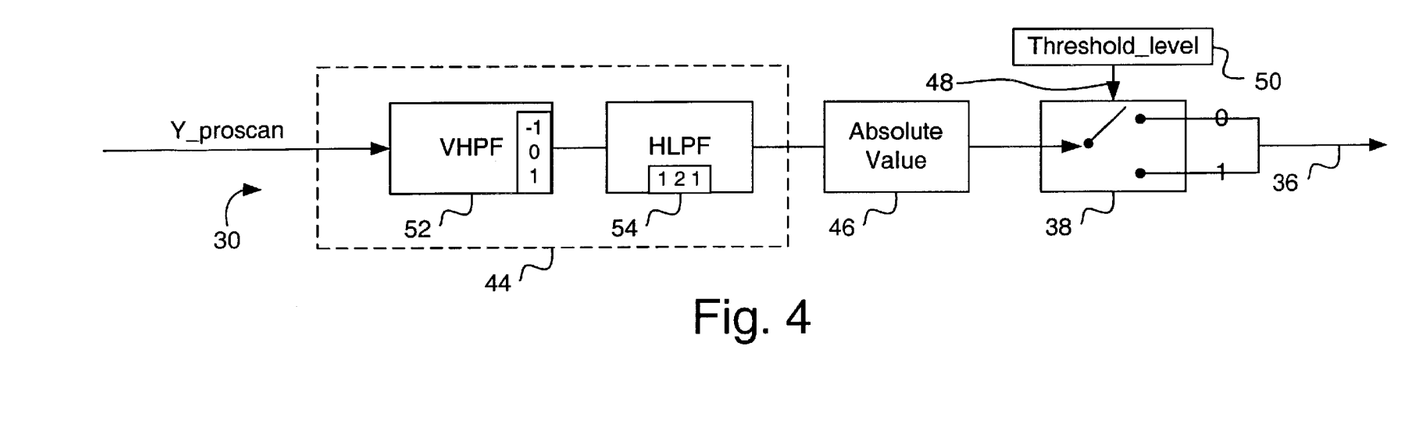
FIG. 4 is a block diagram showing further details of the binary edge detector of FIG. 3.

The impulse response of the Sobel operator 44 is a two-dimensional sequence which can be realized as a cascade, or convolution, of two one-dimensional filters, such as the vertical high-pass filter (VHPF) 52 and the horizontal low-pass filter (HLPF) 54 shown in FIG. 4. The sequence in which the signal 14 is operated on by the filters 52 and 54 is not important and can be reversed so that the signal 14 is operated on first by HLPF 54 and then by VHPF 52. Edge detection is performed by the VHPF 52 which detects vertical type transitions in images represented by signal 14. More specifically, the VHPF 52 detects the vertical component of transitions, which means that it detects transitions that have a vertical transition component, in other words, transitions that are not purely horizontal. As used herein, the term vertical edge detection is understood to be synonymous with non-horizontal edge detection, in other words, detection of transitions that have some vertical transition. HLPF 54 performs low-pass noise removal to filter out minor variations in vertical transitions. In alternative embodiments, the noise removal function performed by the HLPF 54 can be eliminated, leaving only the vertical edge detection performed by VHPF 52.

If the horizontal low-pass filter 54 is applied with the values [1 2 1] across each row of the matrix provided by the vertical high-pass filter 52, then the first row of the resulting matrix contains the values [−1, −2, −1], the second row contains the values [0, 0, 0] and the third row contains the values [1, 2, 1].

Figure 5:
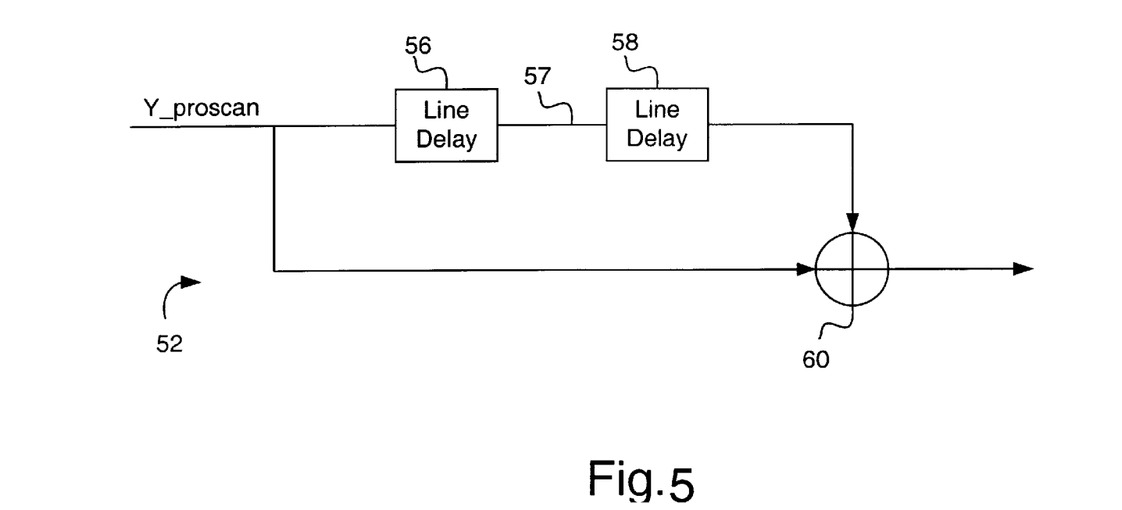
FIG. 5 is a block diagram showing further details of the vertical high-pass filter of FIG. 4.

The vertical high-pass filter 52, shown in further detail in FIG. 5, takes the form of a 3-tap filter with coefficients {1, 0, −1}. Since the central tap 57 is zero, the delayed input line corresponding to the central tap is not used in the computations. Two line delay elements 56 and 58 operate to generate the second (central) and third taps, respectively, of the filter. The output of delay element 58 is summed by summing element 60 with the input to the filter 52 to generate the filter output operated on by HLPF 54.

Figure 6:
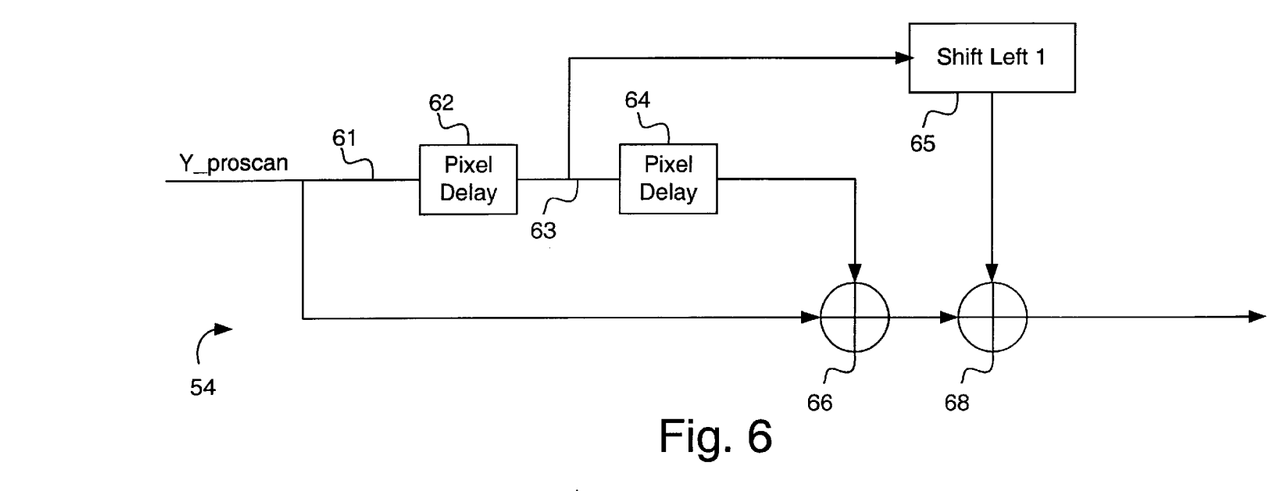
FIG. 6 is a block diagram showing further details of the horizontal low-pass filter of FIG. 4.

The HLPF 54, shown in further detail in FIG. 6, receives the output of the vertical high-pass filter 52 and generates second and third taps of the filter with pixel delay elements 62 and 64 respectively. The first and third taps 61 and 63 are summed by summing element 66 and then normalized by summing element 68. The normalization is performed by shifting, with shifter 65, the output of the second tap 63 to the left one-bit to implement a multiply by two and then adding the result at summing element 68 with the result generated by summing element 66.

The absolute value module 46 generates the magnitude of the output of module 54 in a conventional manner. Comparator 38 operates conventionally to compare the output of the module 46 with a stored threshold value 48 and to generate a single bit single indicating the results of the comparison.

Figure 7:
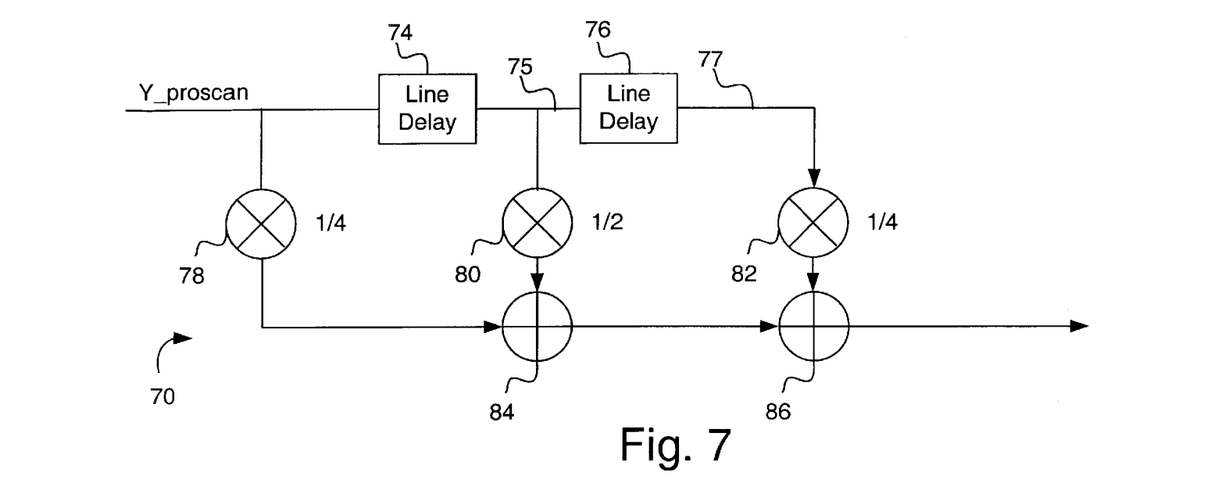
FIG. 7 is a block diagram showing further details of the vertical low-pass filter of FIG. 3.

Sub-module 32 is now described in further detail. Vertical low-pass filter (VLPF3) 70 operates to generate a signal that blurs vertical transitions in the Y component of signal 14. In an exemplary embodiment, the filter 70 takes the form of a 3-tap vertical low pass filter, shown in further detail in FIG. 7. The output of the VLPF3 70 is further filtered by horizontal low-pass filter (HLPF7) 72. In an exemplary embodiment, HLPF7 72 takes the form of a 7-tap horizontal low pass filter. The processing of the Y component of signal 14 by the filters 70 and 72 limits the horizontal resolution of the Y component of signal 14 to one-quarter of the sampling clock frequency. This results in a smoothing of the luminance (Y) component of the signal 14 so that previously introduced interpolation artifacts (such as by module 12) are no longer visible.

The vertical low-pass filter 70 takes the form of a simple 3-tap raised cosine filter with coefficient values of {¼, ½, ¼}. The implementation of the filter 70, shown in FIG. 7, includes line delay elements 74 and 76 which take the form of line delay memories to generate the second 75 and third 77 taps, respectively, of the filter 70. The three taps of the filter 70 are multiplied by multipliers 78, 80 and 82 with the coefficient values {¼, ½, ¼}, respectively. The outputs of multipliers 78 and 80 are summed by summing element 84 and the output of summing element 84 is summed with the output of multiplier 82 by summing element 86 to generate the output of the filter 70.

Figure 8:
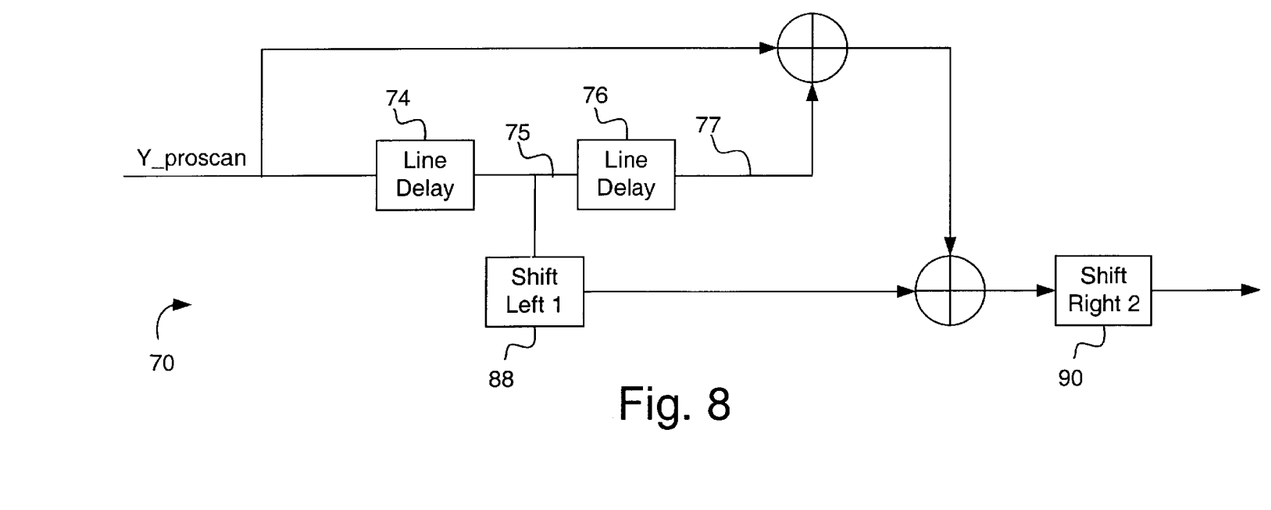
FIG. 8 is a block diagram showing further details of an alternative embodiment of the vertical low-pass filter of FIG. 3.

An alternative embodiment of the filter 70 is shown in FIG. 8. Advantageously, the structure shown in FIG. 8 provides an efficient implementation that avoids the multipliers required by the embodiment of FIG. 7. As can be seen in FIG. 8, the multipliers 78, 80 and 82 have been eliminated. Multiplier 80 is replaced by shifter 88 which shifts the output of line delay element 74 to the left one-bit to achieve a multiplication by the coefficient value of ½. Multipliers 78 and 80 are replaced by shifter 90 with a corresponding change in the order in which the taps of the filter are summed together.

Figure 9:
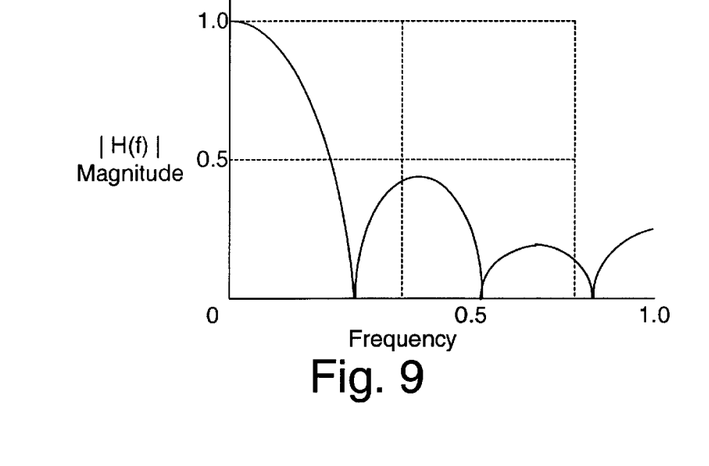
FIG. 9 is a graph illustrating frequency response of the horizontal low-pass filter of FIG. 3.
Figure 10:
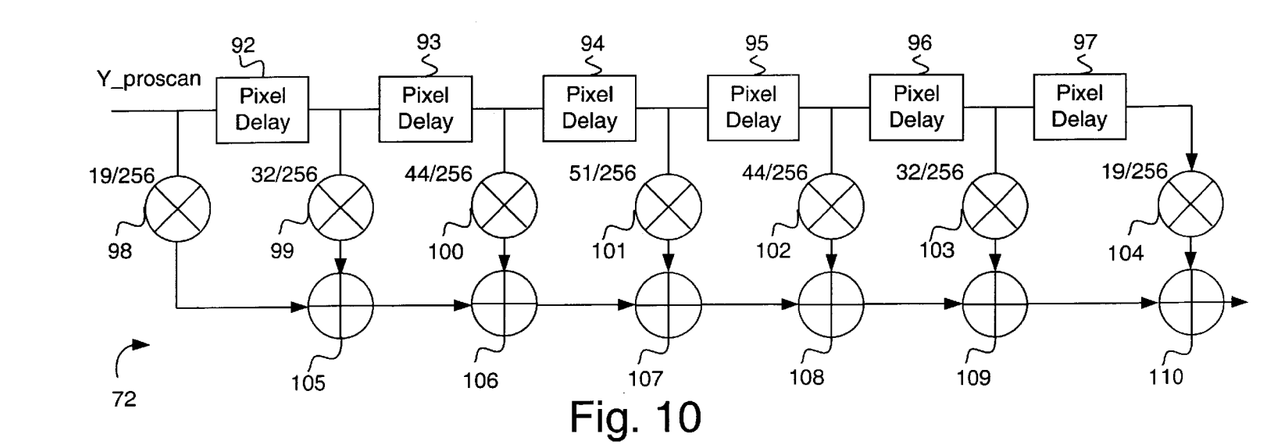
FIG. 10 is a block diagram showing further details of the horizontal low-pass filter of FIG. 3.

The HLPF7 72 operates, in response to the output of VLPF3 70, to reduce the horizontal resolution of the Y component of signal 14 by an amount that is sufficient to mask any interpolation artifacts in a BOB up-converted progressive scan video signal. In certain embodiments, a reduction of resolution by a factor of four may be sufficient. The HLPF7 72 rejects horizontal frequency components with frequencies greater than a user-specified cutoff frequency, which is a fraction of the horizontal sampling frequency. The filter 72 delays the input by a time delay equal to three pixels. The frequency response of the filter 72 is shown in FIG. 9. An exemplary embodiment of the filter 72 is shown in FIG. 10. By way of example, sufficient attenuation can be achieved with a seven-tap filter and the following filter coefficient values: {20/256, 34/256, 47/256, 54/256, 47/256, 34/256, 20/256}. Notice that the filter coefficients have been normalized to add up to one. Pixel delay elements 92–97 each generate a time delay of one pixel to generate taps 2–7 of the filter 72. Multipliers 98–104 multiply the corresponding tap (1–7 respectively) with the respective coefficient. The output of multipliers 98 and 99 are summed by summing element 105. Summing elements 106–110 sum the output of the prior summing element with the output of the corresponding multiplier (100–104) to generate the output of the filter 72.

Figure 11:
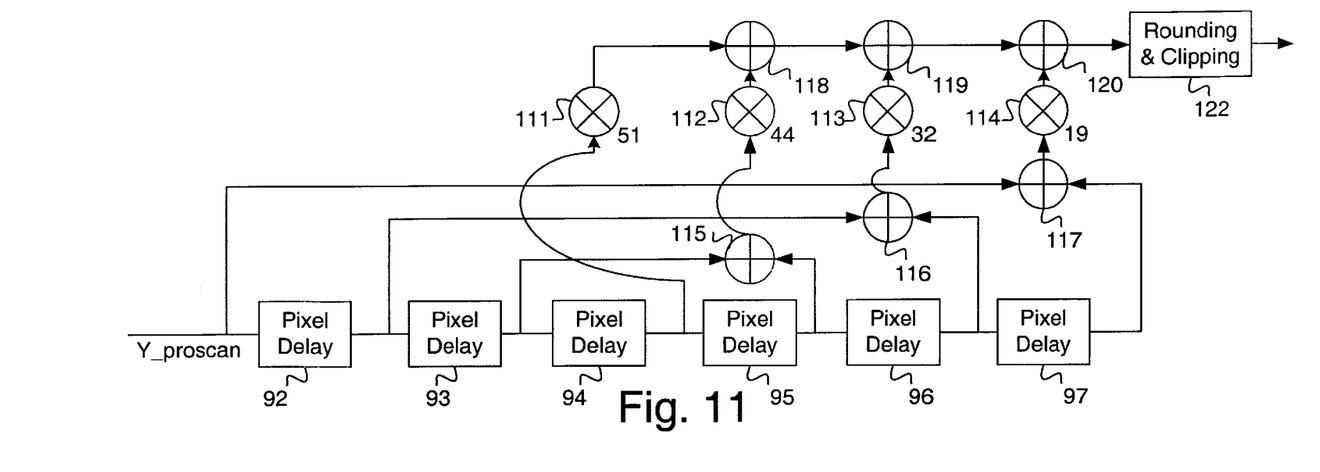
FIG. 11 is a block diagram showing further details of an alternative embodiment of the horizontal low-pass filter of FIG. 3.

The coefficients in the filter shown in FIG. 10 are symmetrical, and therefore three of the multipliers can be eliminated. Also, the multiplication by rational values can be replaced by multiplication by the numerators only with a 8-bit shift left operation at the output of the filter. A hardware implementation of the filter 72 operating in accordance with such principles is shown in FIG. 11. The implementation shown in FIG. 11 takes advantage of the fact that the filter 72 is symmetrical and of odd length. The pixel delay elements 92–97 are the same. Multipliers 111, 112, 113 and 114 and summing elements 115–120 perform the functions performed by multipliers 98–104 and summing elements 105–110. Effectively, the sequence of multiplication followed by summation in the embodiment of FIG. 10 is replaced by summation, multiplication and summation to reduce the number of required multipliers. Complexity of the filter shown in FIG. 11 can be further reduced by replacing the multipliers 111–114 with a number of shifts and add or subtract operations. FIG. 11 shows a rounding and clipping function 122 that performs rounding and clipping of values generated in an embodiment that employs integer arithmetic. If the embodiment of FIG. 10 is implemented with integer arithmetic then rounding and clipping of the values generated therein would also be required to achieve the desired results.

Module 34 provides a delay compensated version of the full resolution Y component of signal 14. Module 34 operates to generate the same amount of delay as delay compensation modules 18 and 20 shown in FIG. 2 and described in the accompanying description.

It is to be understood that the specific mechanisms and techniques which have been described are merely illustrative of one application of the principals of the invention. For example, many of the functions disclosed herein can be implemented equally well with dedicated hardware, or with programmable circuitry. Numerous additional modifications may be made to the methods and apparatus described without departing from the true spirit of the invention.

What is claimed is:

1. An apparatus comprising:

a converter for converting a digitally sampled interlaced video stream to a non-interlaced video stream; and an artifact masker, responsive to at least a first component of said non-interlaced video stream, for adaptively modifying said first component of said non-interlaced video stream to reduce artifacts introduced into said non-interlaced video stream by said converter to generate a modified non-interlaced video stream, wherein said masker comprises:

a first processing module responsive to said non-interlaced video stream for performing a first processing function on said non-interlaced video stream;

a second processing module responsive to said non-interlaced video stream for performing a second processing function on said non-interlaced video stream; and a third processing module responsive to said non-interlaced video stream for selecting output of said first processing module or said second processing module to generate said modified non-interlaced video stream.

2. Apparatus comprising:

a converter for converting a digitally sampled interlaced video stream to a non-interlaced video stream; and an artifact masker, responsive to at least a first component of said non-interlaced video stream, for adaptively modifying said first component of said non-interlaced video stream to reduce artifacts introduced into said non-interlaced video stream by said converter to generate a modified non-interlaced video stream, wherein said masker comprises:

a first processing module responsive to said non-interlaced video stream for performing a first processing function on said non-interlaced video stream; wherein said first processing module comprises:
  a vertical low-pass filter, responsive to said non-interlaced video stream for generating a first filtered signal; and
  a horizontal low-pass filter, responsive to said first filtered signal for said output of said first processing module;
a second processing module responsive to said non-interlaced video stream for performing a second processing function on said non-interlaced video stream; and
a third processing module responsive to said non-interlaced video stream for selecting output of said first processing module or said second processing module to generate said modified non-interlaced video stream.

3. Apparatus as set forth in claim 2 wherein said vertical low-pass filter reduces resolution of vertical transitions in images represented by said non-interlaced video stream.

4. Apparatus as set forth in claim 3 wherein said horizontal low-pass filter reduces resolution of horizontal transitions in images represented by said non-interlaced video stream.

5. Apparatus as set forth in claim 3 wherein said vertical low-pass filter is a three-tap type filter.

6. Apparatus as set forth in claim 4 wherein said horizontal low-pass filter is a seven-tap type filter.

7. Apparatus comprising:
a converter for converting a digitally sampled interlaced video stream to a non-interlaced video stream; and
an artifact masker, responsive to at least a first component of said non-interlaced video stream, for adaptively modifying said first component of said non-interlaced video stream to reduce artifacts introduced into said non-interlaced video stream by said converter to generate a modified non-interlaced video stream, wherein said masker comprises:
  a first processing module responsive to said non-interlaced video stream for performing a first processing function on said non-interlaced video stream;
  a second processing module responsive to said non-interlaced video stream for performing a second processing function on said non-interlaced video stream; and
  a third processing module responsive to said non-interlaced video stream for selecting output of said first processing module or said second processing module to generate said modified non-interlaced video stream, wherein said third processing module comprises:
    a binary edge detection module, responsive to said non-interlaced video stream for generating an edge detect signal indicative of a non-horizontal transition in images represented by said non-interlaced video stream;
    a magnitude module, responsive to said edge detect signal, for generating a magnitude signal indicative of magnitude of said edge detect signal;
    a comparator, responsive to said magnitude signal, for generating a comparison signal, indicative of a comparison between said magnitude signal and a stored threshold value; and
    a delay module, responsive to said comparison signal, for time delaying said comparison signal by a predetermined time delay value, to generate said output of said second processing module.

8. Apparatus comprising:
a converter for converting a digitally sampled interlaced video stream to a non-interlaced video stream; and
an artifact masker, responsive to at least a first component of said non-interlaced video stream, for adaptively modifying said first component of said non-interlaced video stream to reduce artifacts introduced into said non-interlaced video stream by said converter to generate a modified non-interlaced video stream, wherein said masker comprises:
  a first processing module responsive to said non-interlaced video stream for performing a first processing function on said non-interlaced video stream, wherein said first processing module comprises means for reducing resolution of images represented by said non-interlaced video stream;
  a second processing module responsive to said non-interlaced video stream for performing a second processing function on said non-interlaced video stream; and
  a third processing module responsive to said non-interlaced video stream for selecting output of said first processing module or said second processing module to generate said modified non-interlaced video stream.

9. Apparatus comprising:
a converter for converting a digitally sampled interlaced video stream to a non-interlaced video stream;
an artifact masker, responsive to at least a first component of said non-interlaced video stream, for adaptively modifying said first component of said non-interlaced video stream to reduce artifacts introduced into said non-interlaced video stream by said converter to generate a modified non-interlaced video stream, wherein said masker comprises:
  a first processing module responsive to said non-interlaced video stream for performing a first processing function on said non-interlaced video stream;
  a second processing module responsive to said non-interlaced video stream for performing a second processing function on said non-interlaced video stream, wherein said second processing module comprises:
    a delay module, responsive to said non-interlaced video stream for time delaying said non-interlaced video stream by an amount equal to a time delay introduced by said first processing module, to generate said output of said second processing module; and
  a third processing module responsive to said non-interlaced video stream for selecting output of said first processing module or said second processing module to generate said modified non-interlaced video stream.

10. Apparatus as set forth in claim 9 wherein said delay module comprises:
a line delay module for delaying said non-interlaced video stream by one scan line; and
at least a first pixel delay module coupled to receive output of said line delay module for delaying said non-interlaced video stream by one pixel.

11. Apparatus as set forth in claim 9 wherein said stored threshold value is a programmable value.

12. A method for removing artifacts introduced into an image by conversion of said image from an interlaced format to a non-interlaced format comprising:

generating a selection signal by performing non-horizontal edge detection upon a signal indicative of said non-interlaced format;

adaptively filtering said signal indicative of said non-interlaced format to generate a reduced resolution signal;

delaying said signal indicative of said non-interlaced format by an amount equal to a delay introduced into said filtered signal to generate a delayed signal; and selecting said reduced resolution signal or said delayed signal as a function of said selection signal.

13. A graphics processor comprising:

a scan conversion module, responsive to an interlaced signal for generating a non-interlaced signal as a function of interpolation of scan lines of said interlaced signal;

an edge detector, responsive to said non-interlaced signal, for detecting non-horizontal transitions in images represented by said non-interlaced signal to generate a selection signal;

a filter, responsive to said non-interlaced signal, for generating a filtered non-interlaced signal having lower resolution than the resolution of said non-interlaced signal;

a delay module, responsive to said non-interlaced signal, for generating a time delayed non-interlaced signal; and a selector for selecting between said time delayed non-interlaced signal and said filtered non-interlaced signal as a function of said selection signal.

* * * * *